UNITED STATES PATENT OFFICE.

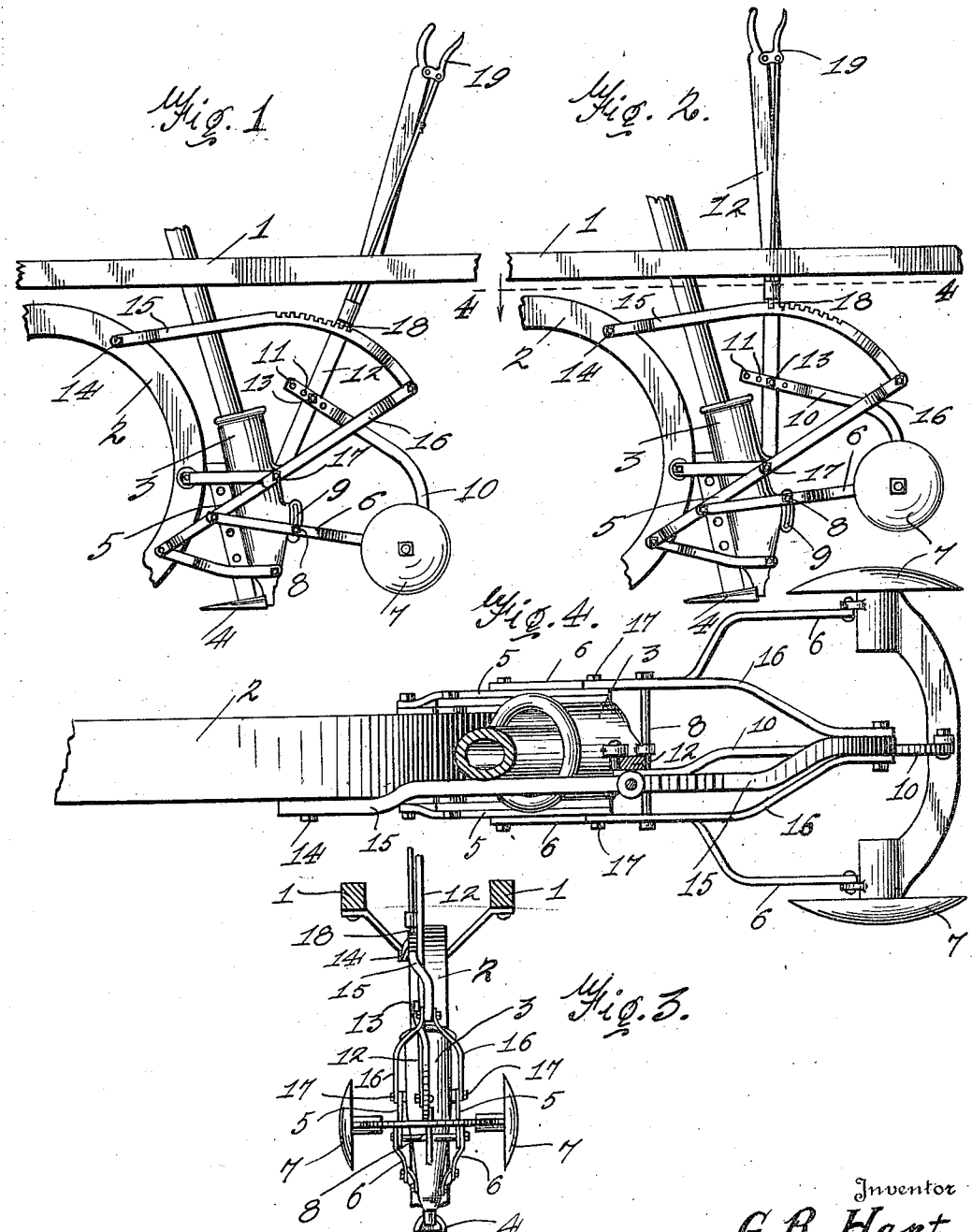

GEORGE R. HART, OF SAND CREEK, OKLAHOMA.

LISTER.

1,235,892.  Specification of Letters Patent.  Patented Aug. 7, 1917.

Application filed February 24, 1915. Serial No. 10,285.

*To all whom it may concern:*

Be it known that I, GEORGE R. HART, a citizen of the United States, residing at Sand Creek, in the county of Grant, State of Oklahoma, have invented certain new and useful Improvements in Listers; and I do hereby declare the following to be a full, clear, and exact description of the invention, such as will enable others skilled in the art to which it appertains to make and use the same.

This invention relates to new and useful improvements in listers.

An object of the invention resides in the provision of novel means for raising and lowering the covering disks.

A further object of the invention resides in the provision of means for adjusting the connection between the disk frame and the controlling lever so that the effect of the movement of the lever to raise or lower the disks may be varied.

With these and other objects in view, such as will appear as the description progresses, my invention comprises the combination and arrangement of parts as set forth in and falling within the scope of the appended claims.

Referring to the drawing:

Figure 1 is a side elevation of my device, showing the disks in their lowered positions, only parts of the lister being shown as are necessary to illustrate the application of my device thereto.

Fig. 2 is a similar view showing the disks in their raised positions.

Fig. 3 is a rear elevation of the device in the position shown in Fig. 2.

Fig. 4 is a horizontal sectional view on line 4—4 of Fig. 2.

Referring to the drawing wherein like parts are indicated by like characters throughout the several views:—

The frame of the lister is indicated by the reference character 1, the plow beam by the character 2, the seed boot by the character 3 and the sub-soiler by the character 4. This construction is similar to the construction of the ordinary lister.

Pivoted to the sub-soil frame 5 is a disk frame 6 on which the covering disks 7 are mounted. This frame is guided in its movement by a pin 8 operable in a slot 9 in the boot 3. In order that these disks 7 may be raised I have secured to the frame 6, between the disks, an arm 10 which has a plurality of holes 11 in the upper end thereof. Pivoted to the boot 3 is a lever 12 to which lever the arm 10 is secured by means of a bolt 13 passing through one of the holes 11 in the said arm 10. Upon the movement of this lever 12 the disks 7 are raised or lowered through the connecting arm 10 between the disk frame 6 and the said lever 12.

In order that the disks may be maintained in their adjusted positions I have secured, at 14, to the plow beam 2 a rack bar 15 which is secured, at its lower end, to a brace 16 which is bifurcated and has its legs passing to the sides of the arm 10 and secured, at 17, to the seed boot 3.

A spring pressed pawl 18 is mounted on the lever 12, is controlled by the handle 19 adjacent the handle of the lever and coöperates with the rack bar 15 to maintain the lever in a predetermined position and thus the disks in their adjusted positions.

From the foregoing description it will be seen that I have provided an improved mechanism for adjusting the disks of a lister so that the adjustment may be made while the lister is being operated.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claims.

What I claim is:—

1. The combination with a lister frame and seed boot, of a sub-soiler, covering disks carried by the frame, a link extending upwardly and forwardly from the swinging end of the frame, a hand lever pivoted on the seed boot and pivotally connected to the free end of said forwardly extending lever, means for varying the distance between the hand lever and the fixed end of the forwardly extending lever, a guide loop formed on the rear side of the seed boot and a sliding connection between said guide loop and the lister frame.

2. The combination with a lister frame and seed boot, of a sub-soiler, covering disks carried by the frame, a link extending upwardly and forwardly from the swinging end of the frame, a hand lever pivoted on the seed boot and pivotally connected to the free end of said forwardly extending lever, a guide loop formed on the rear side of the seed boot and a sliding connection between said guide loop and the lister frame.

In testimony whereof, I affix my signature, in the presence of two witnesses.

GEORGE R. HART.

Witnesses:
I. O. TRASK,
HELEN GARRETT.

Copies of this patent may be obtained for five cents each, by addressing the "Commissioner of Patents, Washington, D. C."